United States Patent [19]
Jennings

[11] 3,731,467
[45] May 8, 1973

[54] GAS AND LIQUID SEPARATOR

[76] Inventor: Irving C. Jennings, c/o The Nash Engineering Co., South Norwalk, Conn.

[22] Filed: Mar. 20, 1972

[21] Appl. No.: 236,516

Related U.S. Application Data

[63] Continuation of Ser. No. 1,725, Jan. 9, 1970, abandoned.

[52] U.S. Cl. ..................55/459, 55/432, 55/447, 55/DIG. 23
[51] Int. Cl. ..............................B01d 45/12
[58] Field of Search ..............................55/203–205, 337, 434–439, 447, 458–461, DIG. 23; 261/30, 79 A

[56] References Cited

UNITED STATES PATENTS

| | | | |
|---|---|---|---|
| 445,472 | 1/1891 | Manning | 55/447 X |
| 585,568 | 6/1897 | Greiwe | 55/458 X |
| 1,754,126 | 4/1930 | Stievenart | 55/423 X |
| 1,755,527 | 4/1930 | Walker | 55/459 X |
| 1,779,023 | 10/1930 | Waters | 55/204 X |
| 1,917,606 | 7/1933 | Sillers | 55/204 X |
| 2,547,769 | 4/1951 | Packie et al. | 55/418 X |
| 2,786,546 | 3/1957 | McMillin | 55/203 |

FOREIGN PATENTS OR APPLICATIONS

| | | | |
|---|---|---|---|
| 766,860 | 1/1957 | Great Britain | 55/459 |
| 937,549 | 9/1963 | Great Britain | 55/DIG. 23 |
| 183,160 | 7/1922 | Great Britain | 55/435 |

*Primary Examiner*—Frank W. Lutter
*Assistant Examiner*—Vincent Gifford
*Attorney*—Nolte and Nolte

[57] ABSTRACT

A separator is provided for separating the liquid and gaseous components of a fluid stream. The separator is comprised of a cylindrical tank, a fluid stream inlet pipe for radially introducing the fluid stream into the cylindrical tank and a baffle mounted within the cylindrical tank for changing the flow path of the radially introduced fluid stream to substantially tangentially strike the interior wall surface of the cylindrical tank whereby the fluid stream flows around the interior wall surface. The liquid and gaseous components of the fluid stream therefore become separated and are removed from the cylindrical tank through separate gas and liquid outlet channels respectively.

2 Claims, 4 Drawing Figures

Patented May 8, 1973
3,731,467
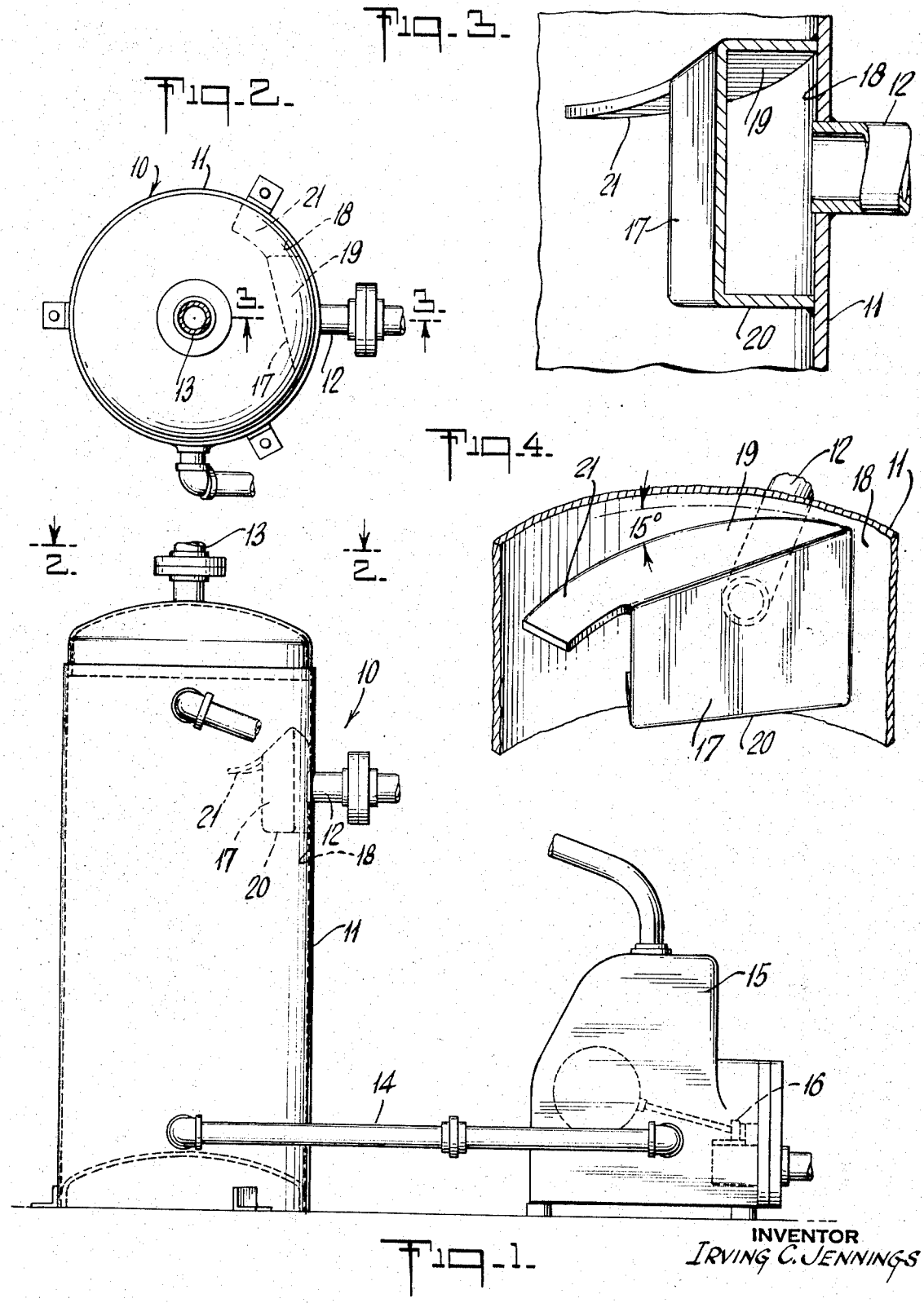
INVENTOR
IRVING C. JENNINGS

GAS AND LIQUID SEPARATOR

This is a continuation of application Ser. No. 1,725, filed Jan. 9, 1970, now abandoned.

BACKGROUND OF THE INVENTION

The present invention relates to gas and liquid separators and more particularly to separators which are to be utilized in conjunction with pumps where the seal water has to be separated from the discharged air.

Gas and liquid separators in which the fluid stream is introduced into the separator tangentially are well known but they are difficult to make, costly to construct (partially due to their large size), and hard to design to meet test specifications for pressure vessels as defined by the A.S.M.E. These separators also tend to be extremely noisy in operation and this is undesirable.

Accordingly, it is an object of the present invention to provide a gas and liquid separator that will handle substantially more gas and liquid for a given size than conventional separators and at the same time give good separation, whereby the size of the separator can be substantially reduced.

It is a further object of the present invention to provide a gas and liquid separator which will be substantially quieter in operation than conventional separators.

It is also an object of the present invention to provide a liquid and gas separator which will easily comply with A.S.M.E. standards for pressure vessels and at the same time is inexpensive to manufacture.

In accordance with the invention, the fluid stream having gaseous and liquid components is radially introduced into the cylindrical tank and an internal baffle redirects the fluid flow to strike the interior wall surface of the cylindrical tank substantially tangentially whereby the fluid will flow around the interior wall of the separator thereby causing the gaseous and liquid components to be separated.

The invention will become more readily apparent from the following description of the preferred embodiment shown in the accompanying drawing, in which:

FIG. 1 is an elevational view of the separator made in accordance with the teachings of the present invention;

FIG. 2 is a top view of the separator shown in FIG. 1 taken along the lines 2—2 thereof;

FIG. 3 is an enlarged perspective view of the baffle structure of the separator shown in dotted lines in FIGS. 1 and 2; and FIG. 4 is another enlarged perspective view of a portion of the separator showing the baffle structure.

The separator 10 includes a cylindrical tank 11, an inlet pipe 12 through which the fluid containing gaseous and liquid components are radially introduced into the cylindrical tank, a gas discharge pipe 13 and a fluid drain 14, a water trap 15, preferably including a float-operated valve 16 for preventing the escape of gas from the separator.

Unlike conventional separators where the fluid is introduced tangentially into the cylindrical tank, the fluid containing gaseous and liquid components is introduced radially into the cylindrical tank 10, as seen in FIG. 2. The radially directed fluid flow impinges upon angular baffle plate 17 which redirects the fluid flow path in order to strike the inner tank wall 18 substantially tangentially thereto, whereby the water will flow around the wall 18 of the separator 10 thereby effecting a separation of the gaseous and liquid components. Optionally, plate portions 19, 20 may extend between the uppermost and lowermost ends of the baffle plate 17 and the cylindrical tank wall 18 whereby a channel will be established. The resulting channel thereby confines the incoming fluid to a narrow path around the separator and this confinement makes possible a substantial reduction in the height and therefore the size of the separator. It is preferred to incline the channel downwardly slightly (about 15°) from the horizontal, as seen in FIG. 4, in order to cause the influent fluid stream to flow downwardly around the interior wall 18 of the separator 10. By so confining the liquid in a narrow path mixed with the high velocity gas, the normal high volume of noise will be substantially muffled. To prevent drip from being blown up from the top of the channel, a shelf 21 extends outwardly from the top 19 of the baffle.

This separator is very useful in connection with pumps where the seal water has to be separated from the discharged air or in any other situation where it is desired to separate the gaseous and liquid components of a fluid stream such as is disclosed in my U.S. Pat. No. 3,315,879.

What is claimed is:

1. A separator for separating the liquid and gaseous components of a fluid stream comprising a cylindrical tank, a conduit opening radially into the tank, baffle means secured to and extending around the interior surface of the tank and comprising spaced side walls projecting substantially horizontally from the interior surface of the tank and a base interconnecting edges of the side walls remote from the surface of the tank and defining with the side walls a channel, said channel being inclined slightly downwardly of the tank, the upper end of the channel being closed and the lower end being opened, said conduit opening to the interior of the channel close to the upper end, said side walls being of progressively lesser height towards the closed end of said channel and said base having a substantially vertical edge secured to said interior surface of the tank to close the upper end of the channel; said tank having a gas discharge outlet in its upper extremity, said baffle means being located downwardly of said gas discharge outlet and said tank being completely free of inward projections between the baffle means and said discharge outlet; a float controlled liquid discharge outlet at the bottom of said tank, the upper one of said side walls of the baffle means being extended beyond the open end of the channel and secured to said interior surface of the tank to form a shelf for preventing drip from being blown from the top of the channel at the open end thereof; whereby a fluid stream entering the tank through said inlet is redirected and confined to a path downwardly and around the inner cylindrical surface of the tank to become separated into its gaseous and liquid components.

2. A separator according to claim 1 wherein said channel means is inclined downwardly on said separator interior wall surface at an angle of approximately 15° to the horizontal axis of said cylindrical tank means.

* * * * *